Dec. 3, 1940.  L. S. WILLIAMS  2,223,773
SCALE INDICATING MEANS
Filed March 8, 1937.  4 Sheets-Sheet 1
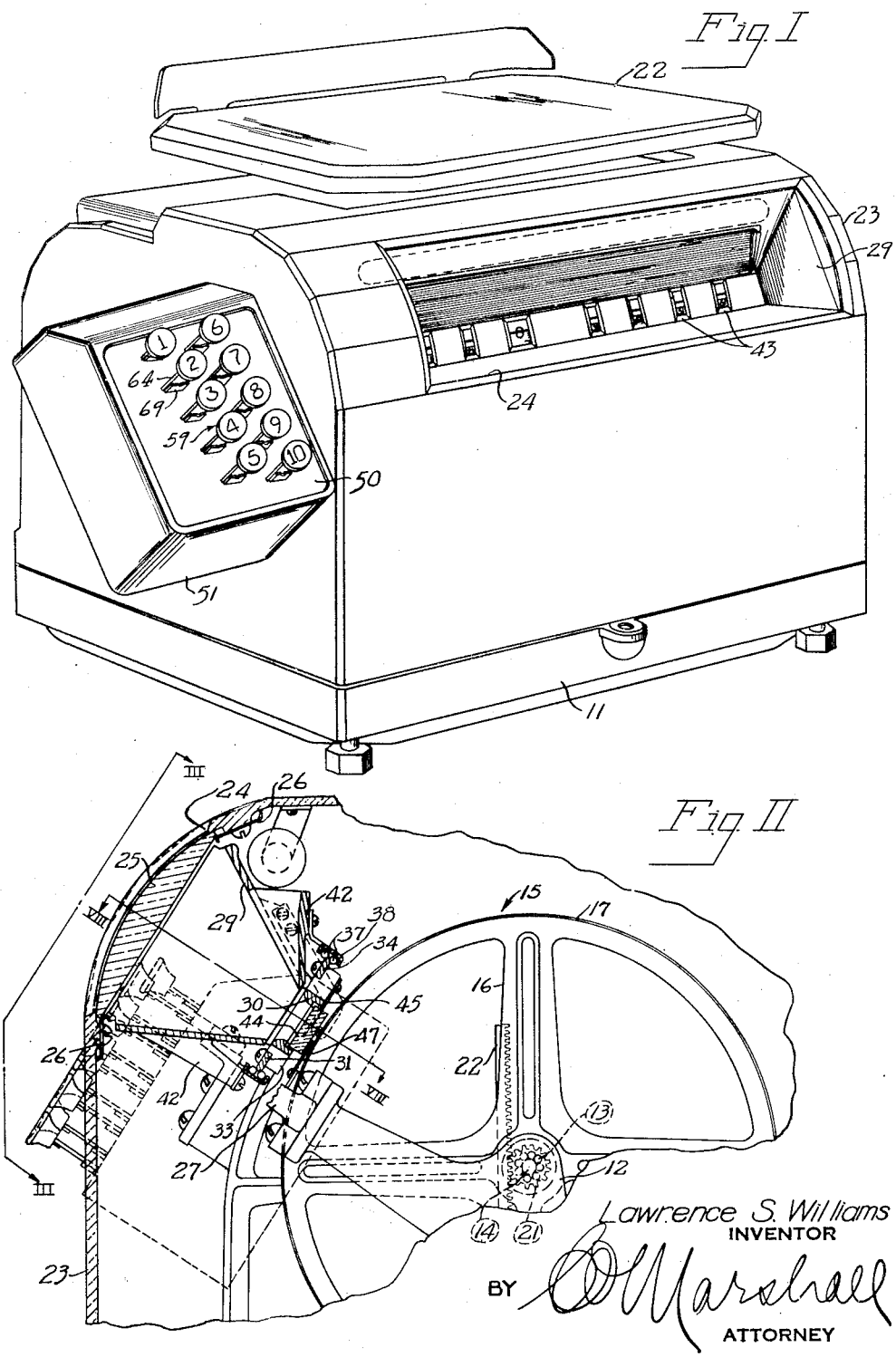
Lawrence S. Williams
INVENTOR
BY  Marshall
ATTORNEY

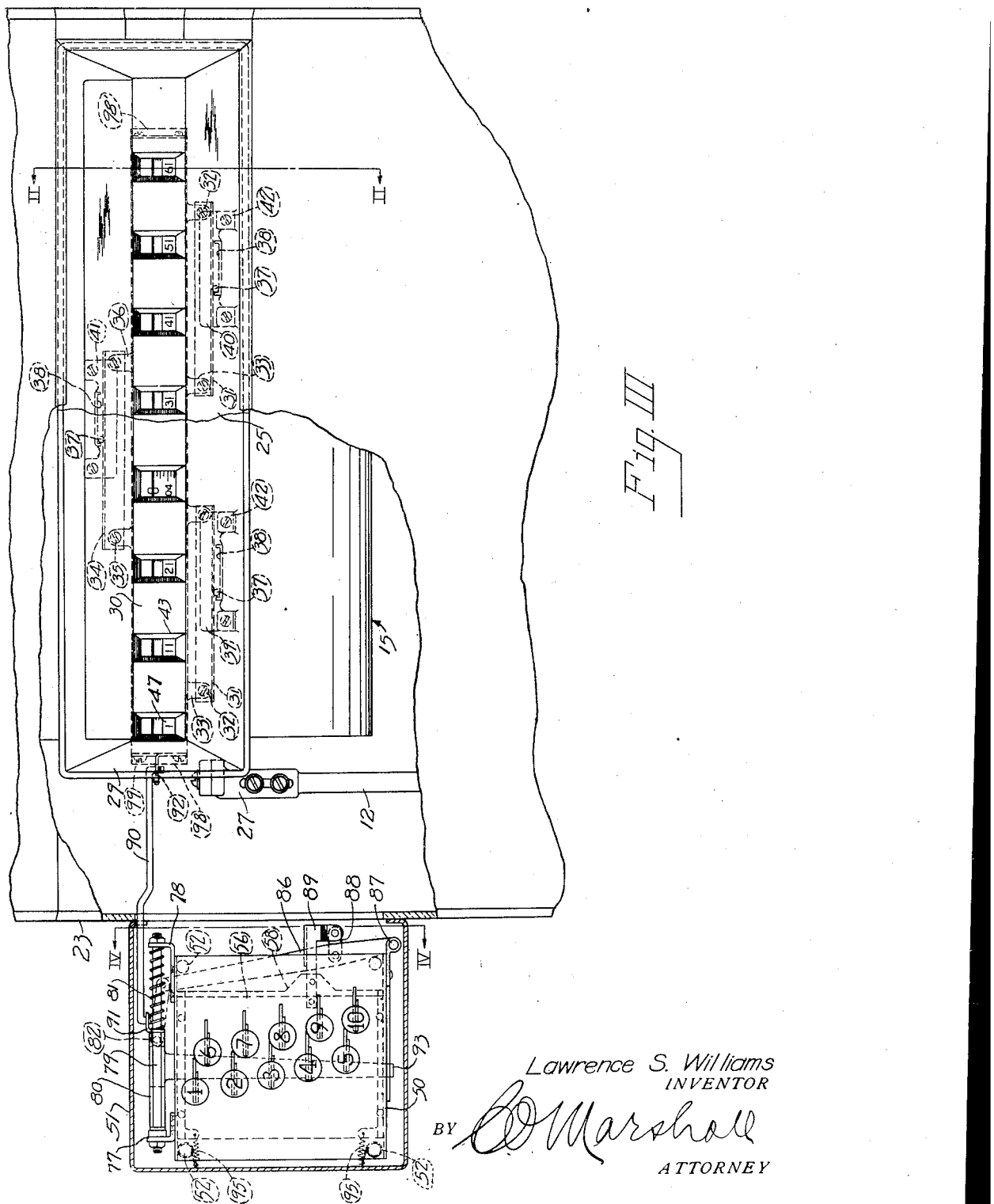

Dec. 3, 1940.    L. S. WILLIAMS    2,223,773
SCALE INDICATING MEANS
Filed March 8, 1937    4 Sheets-Sheet 3
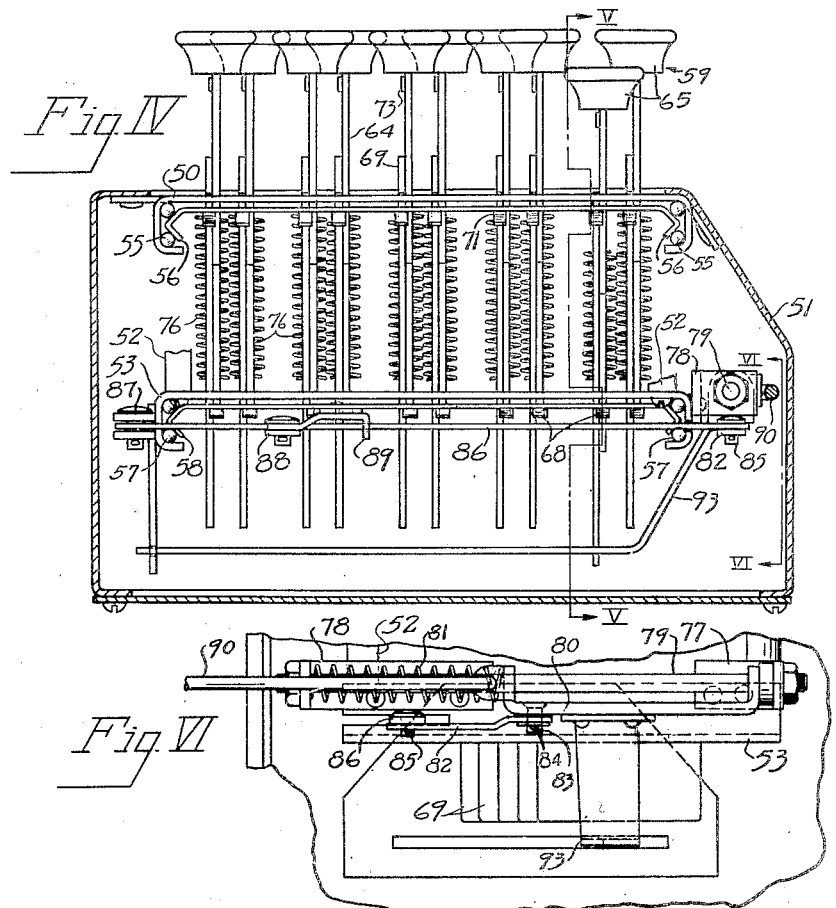
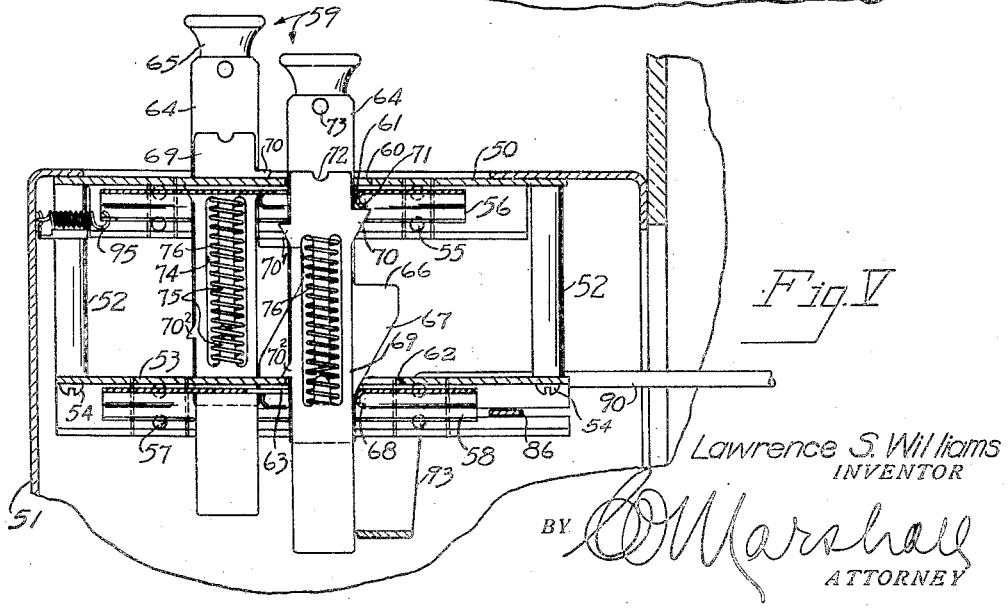
Lawrence S. Williams
INVENTOR
BY  Marshall
ATTORNEY Dec. 3, 1940.  L. S. WILLIAMS  2,223,773
SCALE INDICATING MEANS
Filed March 8, 1937  4 Sheets-Sheet 4
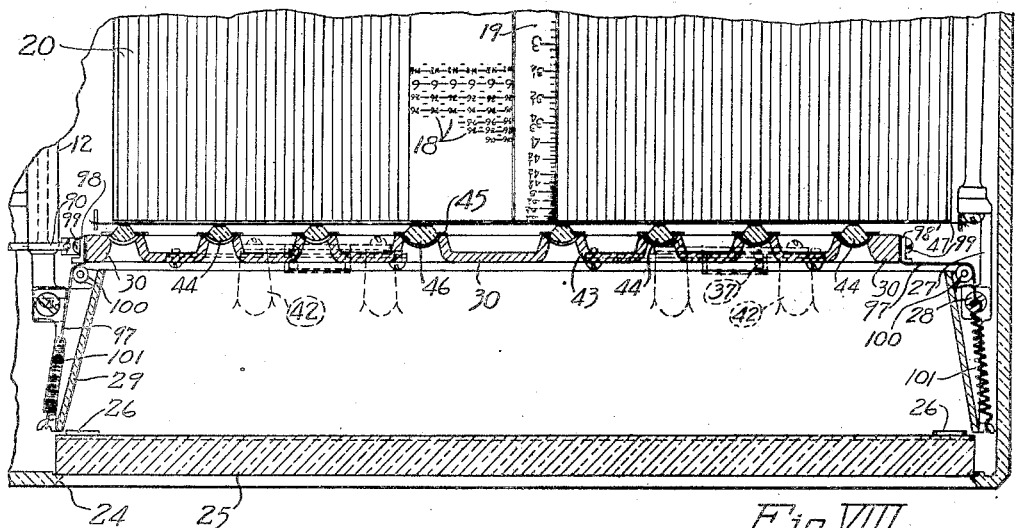
Fig. VIII
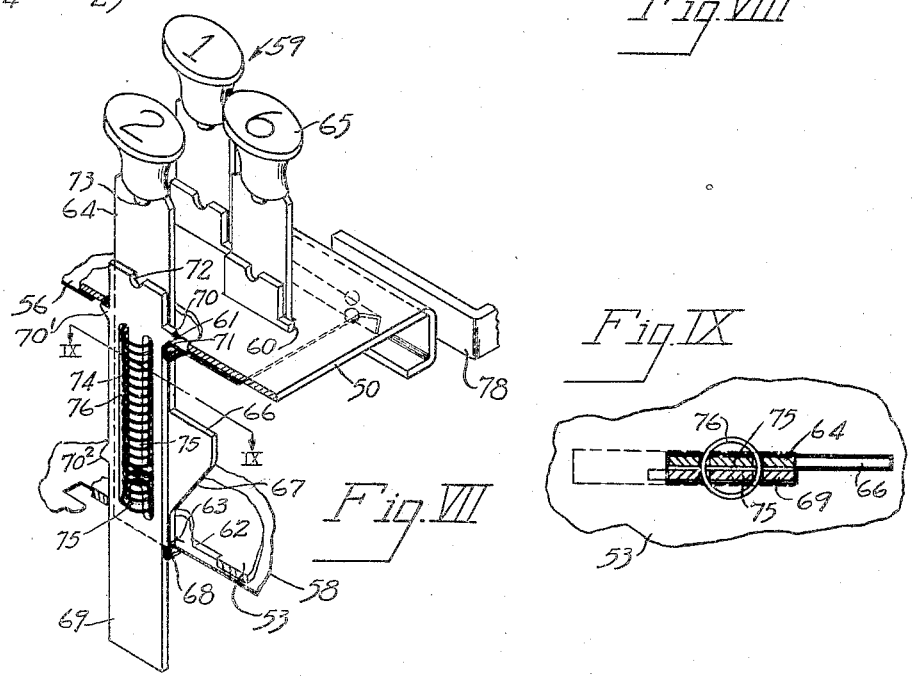
Fig. VII
Fig. IX
Lawrence S. Williams
INVENTOR
BY Marshall
ATTORNEY Patented Dec. 3, 1940

2,223,773

UNITED STATES PATENT OFFICE 2,223,773

SCALE INDICATING MEANS

Lawrence S. Williams, Toledo, Ohio, assignor to Toledo Scale Company, Toledo, Ohio, a corporation of New Jersey Application March 8, 1937, Serial No. 129,690

2 Claims. (Cl. 265—29)

This invention relates generally to weighing scales, and more particularly to indicating means of computing scales, such as are used in retail establishments. Such scales are usually provided with a chart having rows of computed prices for different unit values and an index for selecting the proper computed value.

The principal object of this invention is the provision of improved means for aiding in the selection of the proper computed value.

Another object is the provision of a plurality of lenses mounted in spaced relation to each other.

Another object is the provision of improved means for shifting a series of magnifying lenses.

Still another object is the provision of improved means whereby relatively few lenses are capable of magnifying all of a comparatively large number of columns of computed values.

Another object is the provision of improved means whereby a plurality of relatively small lenses, cooperating with a single, large lens, may be shifted in relation thereto without changing the focus of the system.

Still another object is the provision of improved means for selectively positioning a plurality of lenses.

Another object is the provision of an improved keyboard controlled device for positioning such lenses.

Yet another object is the provision of a plurality of weight indicia columns and a single lens adapted to selectively cooperate therewith to magnify said indicia.

These, and other objects and advantages will be apparent from the following description, in which reference is had to the accompanying drawings wherein similar reference numerals refer to similar parts throughout the several views.

In the drawings:

Figure I is a perspective view of a scale embodying the invention.

Figure II is an enlarged fragmentary sectional view showing the optical system, the section being substantially along the line II—II of Figure III.

Figure III is an enlarged fragmentary front elevational view of the movable lens frame and of the positioning mechanism, seen substantially from the line III—III of Figure II.

Figure IV is a sectional view through the key mechanism, sectioned on the line IV—IV of Figure III.

Figure V is an enlarged sectional end view, substantially along the line V—V of Figure IV.

Figure VI is an enlarged detailed view of a portion of the lens frame shifting device seen substantially from along the line VI—VI of Figure IV.

Figure VII is an enlarged fragmentary perspective view showing the key shift mechanism of Figure V, in greater detail.

Figure VIII is a plan sectional view through the lens system and showing a fragment of the computing chart, the section being on the line VIII—VIII of Figure II; and, Figure IX is a fragmentary plan, sectional view through one of the operating keys, the section being substantially on the line IX—IX of Figure VII.

Referring to the drawings in detail:

The scale in connection with which I have shown the object of the invention is fully disclosed and described in U. S. Patent No. 2,066,624 to H. W. Hem. It comprises a base 11 on which are mounted brackets 12. Aligned portions of the brackets 12 are equipped with ball bearings 13 in which the ends of shaft 14 of a chart 15 are mounted. The chart additionally comprises a pair of chart spiders 16 which are fixedly mounted on the shaft 14 in spaced relation to its ends. The chart surface 17 comprises a sheet of thin aluminum which envelops the spider 16 and has printed thereon rows or columns 18 and 19 of weight indicia and rows 20 of computed value indicia. The plurality of rows 18 are similar and indicate the weight of the commodity being weighed to the merchant and the row 19 of weight indicia is adapted to give the weight indication to the customer on the opposite side of the scale. The rows 20 of computed value indicia are numerically arranged, that is, the first computed values indicia row gives the price of material at 1¢ per lb., the next at 2¢ per lb., and so forth.

Also mounted and pinned on the shaft 14, near one of its ends, is a pinion 21 whose teeth mesh with the teeth of a rack 22 which is actuated by the lever system of the scale and whose movement is controlled by the load counterbalancing means so that it is moved through a distance corresponding to the amount of load on a scale platform 22 and consequently revolves the chart, through an angle which also corresponds to the amount of load, in the well known manner. The load platter 22 is mounted above a casing 33 which rests on the base 11 and houses the entire scale mechanism.

The casing 23 is provided with a longitudinally extending opening 24 in which is mounted a plano-cylindrical lens 25. This lens is immovably retained to the casing by means of clips 26. A bezel 29 of thin aluminum, or other suitable material, is fastened to projecting portions 27, of the brackets 12, by means of screws 28 (Fig. VIII). This bezel is substantially frusto pyramidal in shape and its larger end is positioned immediately in back of the lens 25 and its smaller open end overlies a portion of the chart surface. In the space between the chart 15 and the smaller open end of the bezel 29 is a lens frame 30. To slidably support the frame 30, two flat metal bearing members 31 are fastened to integral, downwardly projecting bosses 33 by means of screws 32 (Fig. III). A similar bearing member 34 is fastened by means of screws 35 to upwardly projecting bosses 36 of the frame 30. The edges of the members 31 and 34 are beveled and rest on bearing balls 37 positioned in substantially U shaped trough-like portions 38 of brackets 39, 40 and 41 which are screwed to suitable bosses 42 of the bezel 29 (Fig. II). This construction permits the lens frame 30 to be moved longitudinally without binding and substantially with no friction.

A series of windows 43, having beveled edges are provided in the lens frame 30 and a plurality of lenses 44 are stationed in these windows. The cross section of the lens is a truncated sector and the width of the flat face, formed by the truncation, is equal to the width of one of the columns of computed value indicia. Clips 45 are employed to retain the lenses to the lens frame.

It is stated hereinbefore that the computed value columns are arranged arithmetically with respect to the unit value which is one of the factors in calculating the computed value. In the initial position of the lens frame the lenses 44 overlie the computed value columns whose unit prices end in the figure one, thus 01—11—21—31 and so on up to the capacity of the chart. When this lens frame is moved the distance of the width of one of the columns 20 the lenses overlie the computed value columns whose unit values end in the figure two, thus 02—12—22—32—42 and so forth. It is possible to shift the lens frame 10 times so as to cover the entire price range. A lens 46 is positioned in the lens frame so as to overlie the first row 18 of weight indicia. This lens is somewhat larger than the lenses 44 and, with the exception when in the two end positions, a single row of weight indicia may be viewed from two successive positions of the lens when the frame is moved; for this reason there are fewer rows of weight indicia to indicate the weight to the merchant than there are shifts of the lens frame. The row 19 of weight indicia is adapted to be viewed by the customer in the usual manner in the back of the casing 23.

Repetitive use of the scale habitualizes the operator to look at certain positions of the chart for certain prices, thus on the old type computing scale the merchant will always, unconsciously focus his eyes on a certain spot for prices within the 20¢ block and at another spot for prices within the 40¢ block and so forth. He must, however, observe care in selecting the proper value within the block, that is in selecting the last figure. Such care need not be exercised with a scale embodying the object of the invention since only a single price within each block is visible, as instinctively the operator will pick out the proper block. In addition, the unit value is also visible in the window. For this purpose, a strip 47 is mounted directly adjacent the chart so that the unit values printed thereon are visible in the openings, through the lenses.

Although it is, of course, possible to provide means for manually sliding the lens frame from position to position as desired, without subtracting from the value of the invention, there is provided a keyboard mechanism for moving the lens frame to the desired position by the mere pressure on a numbered key and thus obviating errors to a greater extent.

This keyboard mechanism is a self contained unit, assembled to a top plate 50 and secured within a casing 51 which is fastened, in proper position, to one of the ends of the casing 23. Projecting downwardly from the top plate 50 are four studs 52 to which a bottom plate 53 is fastened by means of screws 54. The front and back edges of the plate 50 are bent downwardly and inwardly resulting in channel sections in which sets of bearing balls 55 are positioned, on these antifriction means beveled edges of an interlock plate 56 are slidably mounted (see Fig. IV). The ends of the bottom plate 53 are similarly channeled and on bearing balls 57 a shift plate 58 is mounted.

Shift keys 59 which project through registering slots 60, 61, 62 and 63 in the plates 50, 56, 53 and 58 respectively are all of the same design and construction (see Fig. V). Each key comprises two sections which are movable relative to each other, a shifting section 64 and a locking section 69. Both are stamped from flat sheet metal, one of which, key section 64, serves to actuate the lens shift mechanism. This section extending above the top plate 50, is provided with a cap 65 and is adapted to be depressed by the operator's finger. The lower end of the shift section 64 projects through slots 62 and 63 in the plates 53 and 58 respectively and is provided with a laterally projecting portion 66 forming an inclined plane 67 which in the nondepressed position of the key just contacts a curled-over tongue 68 at one end of the slot 63 in the plate 58. The locking section 69 is mounted side by side with the shifting section in the slots hereinbefore referred to. In its initial position, an integral saw tooth-like stop 70 rests with its horizontal shoulder against a curled-over tongue 71 (Figs. V and IX) at one end of the opening 61 in the interlocked plate 56. Similar stops 70' and $70^2$ on the opposite edge of the locking portion 69 are also provided to limit its upward and downward movement respectively. The upper end of the locking section 69 has a semicircular notch 72 into which a laterally projecting punched pod 73 of the shift section 64 is adapted to fit, when the shift section 64 is depressed. Both key sections, 64 and 69, are provided with slots 74 which register with each other when the key is in its initial position. Long and short tongues 75 extend longitudinally in the slots 74, and serve to maintain a compression spring 76 (Figures V and IX) in alignment with the axis of the assembled key. This compression spring 76 is a part of the key assembly and is provided for a purpose which will hereinafter become clear.

The channel section formed along the back edge of the bottom plate 53 has riveted thereto two brackets 77 and 78 which, in aligned apertures, support a slide rod 79 (see Figures VI and III). This slide rod 79 projects through aligned openings in the legs of a substantially U shaped carriage 80. A coil spring 81 surrounds a portion of the slide rod 79 and extends between the projecting leg of the bracket 78 and the carriage 80. To actuate this carriage 80 a link 82 is pivotally connected with one of its ends to a stud 83 dependingly fixed to the carriage 80. A washer and a pin 84 prevent its disengagement. The other end of this link 82 is pivotally connected by means of a pintle 85 to a shift lever 86 which is fulcrumed at 87 (see Figure III) on the front channel of the bottom plate 53. At a point substantially nearer the fulcrum of the lever 86 than its other end a link 88 connects the lever 86 to an extension 89 riveted to the shift plate 58. A connection between the carriage 80 and the lens frame 30 comprises a suitably formed rod 90. Bent-over ends of this rod 90 project through openings in brackets 91 and horizontally formed portion 92 of clamp 98 secured to the carriage 80 and the lens frame 30 respectively. Suitable means are provided to retain the rod 90. Any movement of the carriage 80 is thus transmitted to the slidably mounted lens frame 30. To position the carriage and thus the lens frame at any desired point a locating arm 93 is fastened to the carriage 80. This arm is provided with a horizontally extending portion which cooperates selectively with the shift keys 59.

It has hereinbefore been explained that the keys 59 represent the last digit of the unit value; therefore, when it is desired to set the indicating device to indicate the computed value of a commodity at a given unit value, for example 37¢, pressure on that key 59, which is marked 7, accomplishes this result by shifting the lens frame 30 so that each of the lenses 44 overlie those computed value columns 20 whose unit values end in the Figure 7, such as, 7—17—27—37—47 and so forth. The operation of the mechanism that accomplishes this result is as follows:

Pressure on the cap 65 causes the shift section 64 of the key 59 to move downwardly until the inclined plane 67 of the laterally projecting portion 66 presses against the curled-over tongue 68 of the movably mounted shift plate 58, moving this plate on its ball bearing mounting a distance corresponding to the width of the projecting portion 66. This width corresponds to the width of a block of 10 computed value columns on chart 15, for example, the columns corresponding to the unit values of 31, 32, 33 and so on to 40¢. When the shift section 64 of the key 59 has moved downwardly so that its laterally projecting pod 73 rests in the semi-circular notch 72 in the locking section 69 of the key 59, further movement of this locking section causes its sawtooth-like stop 70, initially resting against the curled-over edge 71 of the interlock plate 56, to shift this interlock plate on its ball bearings 55, permitting the stop 70 to move below the interlock plate 56 and a spring 95 hooked between one end of the interlock plate and one of the studs 52 immediately retracts this interlock plate. Upon removal of the pressure on the cap 65 the spring 81 on the slide rod 79 exerts a retractive force on the shift plate 58 through the shift lever 86 causing the curled-over edge 68 of the slot 63 to follow the inclined edge 67 of the projection 66 when the shifting section 64 of the key moves upwardly. The spring 76, which is a part of the key assembly 59, pushes the locking section 69 upwardly until the horizontal shoulder of the stop 70 engages the curled-over edge of the tongue 71 of the retracted interlock plate thus preventing further upward movement of this locking section 69, which now projects below the plane formed by the ends of the other keys. Since, as hereinbefore stated, the compression of any of the keys moves the shift plate through a predetermined distance, the lens frame 30, being connected through the lever 86, carriage 80 and rod 90, is forced to partake of the same movement. Such movement of the carriage 80 on the slide rod 79 compresses the spring 81. When the pressure on the key is removed the spring 81 urges the carriage towards it initial position until the locating arm 93, which is fastened to the underside of the carriage 80, contacts the locking section of the key which projects into the path of this arm. Since the keys 59 are positioned in echelon formation in the keyboard mechanism (see Figure I) and so spaced in relation to the chart 15 that the edge of the locking section of each key stops the lens frame 30 so that each of the lenses 44 is positioned in front of the desired computed value column. For example, when the "7" key is pressed the lenses will automatically position themselves in front of the columns whose unit value numeral ends in 7. It is now a simple operation for the operator to select the lens through which to read the value.

When positioning the lenses for another operation, pressure on another key shifts the interlock plate 56 a distance which permits the spring 76 to urge the locking section 69 of the previously depressed key upwardly, out of the path of the locking arm 93, and then positions the locking portion of that key in the manner described.

When the frame 30 is in either of its end positions, for example, in the position shown in Figure VIII, a portion of the chart surface 17 extends beyond the edge of the frame 30 and is visible through the lens 25. This is objectionable and to prevent such exposition of the chart, flexible bands 97 are clamped to the end of the frame 30 with the aid of clamps 98, 98' and screws 99. The opposite end of these bands 97 pass over vertically positioned rollers 100 at each end of the bezel 29 and are drawn taut by helical springs 101 which are fastened to the front edge of the bezel 29.

The bands 97 have the same width as the frame 30 and may be made of any material having the required opacity and flexibility.

It will be seen that the embodiment of the invention herein shown and described is well adapted to fulfill the objects primarily stated. It is to be understood, however, that the invention is susceptible to modification, variation and change within the spirit and scope of the subjoined claims.

Having described my invention, I claim:

1. In a device of the class described, in combination, weighing mechanism including a load support and a movable chart and means to position said chart in accordance with a load being weighed, said chart having a plurality of primary computed value zones and each of said zones having subdivisions denoting computed values ranging throughout a series corresponding to various unit prices for a commodity being weighed, a shiftable lens support disposed adjacent the chart and supporting a plurality of spaced lenses, one coacting with each primary zone of the chart, and means for shifting the lens support to bring the lens coacting with each primary computed value zone of the chart into indexed relation with a selected unit price.

2. In a device of the class described, in combination, weighing mechanism including a load support and a movable chart and means to position said chart in accordance with a load being weighed, said chart having a plurality of primary computed value zones and each of said zones having subdivisions denoting computed values ranging throughout a series corresponding to various unit pricess for a commodity being weighed, a shiftable viewing device disposed adjacent the chart and having a plurality of spaced windows, one coacting with each primary zone of the chart, and means for shifting the viewing device to bring the window coacting with each primary computed value zone of the chart into indexed relation with a selected unit price.

LAWRENCE S. WILLIAMS.